US012587284B2

(12) United States Patent
Shih et al.

(10) Patent No.: US 12,587,284 B2
(45) Date of Patent: Mar. 24, 2026

(54) HIGH SPEED OPTICAL RECEIVER SYSTEM

(71) Applicant: Taiwan Semiconductor Manufacturing Company, Ltd., Hsinchu (TW)

(72) Inventors: Chih-Tsung Shih, Hsinchu City (TW); Chia-Ming Hung, Zhubei City (TW); Chi-Yuan Shih, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 244 days.

(21) Appl. No.: 18/472,576

(22) Filed: Sep. 22, 2023

(65) Prior Publication Data

US 2024/0413911 A1 Dec. 12, 2024

Related U.S. Application Data

(60) Provisional application No. 63/507,664, filed on Jun. 12, 2023.

(51) Int. Cl.
| | |
|---|---|
| *H04B 10/61* | (2013.01) |
| *H04B 10/2519* | (2013.01) |
| *H04B 10/2581* | (2013.01) |

(52) U.S. Cl.
CPC ..... *H04B 10/6166* (2013.01); *H04B 10/2519* (2013.01); *H04B 10/2581* (2013.01)

(58) Field of Classification Search
CPC ............ H04B 10/2519; H04B 10/2581; H04B 10/6166
USPC .......................................................... 398/65
See application file for complete search history.

(56) References Cited

U.S. PATENT DOCUMENTS

| | | | | |
|---|---|---|---|---|
| 8,625,935 | B2 * | 1/2014 | Mekis ................... | G02B 6/125 385/2 |
| 10,126,498 | B1 * | 11/2018 | Ma .......................... | G02F 1/011 |
| 10,608,663 | B2 | 3/2020 | Gould et al. | |
| 11,153,009 | B1 | 10/2021 | Parker et al. | |
| 11,313,682 | B1 * | 4/2022 | Hung ................... | G01C 19/725 |
| 2003/0165295 | A1 * | 9/2003 | Doerr ................. | G02B 6/29355 385/39 |

(Continued)

FOREIGN PATENT DOCUMENTS

| | | |
|---|---|---|
| CN | 112054851 A | 12/2020 |
| TW | 202032187 A | 9/2020 |

(Continued)

OTHER PUBLICATIONS

Wilkens et al; Constant photocurrent method and time-of-flight measurements applied to polymer blends; Apr. 2006; pp. 1-4. (Year: 2006).*

*Primary Examiner* — Amritbir K Sandhu
(74) *Attorney, Agent, or Firm* — Harrity & Harrity, LLP

(57) ABSTRACT

Some implementations described herein provide an optical receiver system. The optical receiver system includes optical circuitry that may include a phase shifter device, a demultiplexer device, a power combiner device, and/or a power splitter device. Different combinations of such devices within the optical circuitry may balance and/or reduce photocurrents within the photodiode device to improve a performance (e.g., a bandwidth) of the optical receiver system relative to another optical receiver system that does not include the optical circuitry.

20 Claims, 18 Drawing Sheets

(56)  References Cited

U.S. PATENT DOCUMENTS

| 2010/0166427 | A1 * | 7/2010 | Jeong | H04B 10/65 |
| | | | | 398/82 |
| 2012/0288286 | A1 | 11/2012 | Houtsma et al. | |
| 2018/0067342 | A1 * | 3/2018 | Mekis | G02B 6/29344 |
| 2024/0413911 | A1 * | 12/2024 | Shih | H04B 10/2581 |

FOREIGN PATENT DOCUMENTS

| TW | 202204952 A | | 2/2022 | |
| WO | WO-2010095018 A2 * | 8/2010 | | H04B 10/65 |
| WO | WO-2015135003 A2 * | 9/2015 | | H04B 10/116 |

* cited by examiner

400

402

404

400

406

400

0107-0321

400

408

408a

408b

408c

600

| 612 | | $\lambda_1$ | | $\lambda_2$ | | $\lambda_3$ | |
|---|---|---|---|---|---|---|---|
| 614 | 616 | 618 | 616 | 618 | 616 | 616 |
| (406) ~ 50/50 | 44.4 | 1.91 | 47.5 | 1.86 | 50.6 | 1.83 |

| 408 | 612 | 614 | $\lambda_1$ 616 | $\lambda_1$ 618 | $\lambda_2$ 616 | $\lambda_2$ 618 | $\lambda_3$ 616 | $\lambda_3$ 618 |
|---|---|---|---|---|---|---|---|---|
| 408a | | 2/ 98 | 98.5 | 0.2 | 98.1 | 0.2 | 98.3 | 0.2 |
| | | 4/ 96 | 96.1 | 0.4 | 96.2 | 0.3 | 96.9 | 0.4 |
| | | 6/ 94 | 94.4 | 0.2 | 95.0 | 0.4 | 95.0 | 0.1 |
| | | 8/ 92 | 92.8 | 0.6 | 93.2 | 0.3 | 93.6 | 0.2 |
| | | 10/ 90 | 90.8 | 0.4 | 91.2 | 0.6 | 91.8 | 0.3 |
| 408b | | 20/ 80 | 79.8 | 0.8 | 80.4 | 0.9 | 82.5 | 0.9 |
| | | 29/ 71 | 70.4 | 1.1 | 72.3 | 0.7 | 74.1 | 0.5 |
| | | 30/ 70 | 69.1 | 1.0 | 70.8 | 0.9 | 73.4 | 1.2 |
| 408c | | 50/ 50 | 48.5 | 0.9 | 50.7 | 1.2 | 53.1 | 1.4 |

FIG. 6C

810  Receive first incident light and second incident light

820  Convert the first incident light and the second incident light into respective time-fixed photocurrents 830  Provide electrical currents based on the respective time-fixed photocurrents 840  Convert the electrical currents to an output voltage that is used by an optical communication system

800

HIGH SPEED OPTICAL RECEIVER SYSTEM

CROSS-REFERENCE TO RELATED APPLICATION

This patent application claims priority to U.S. Provisional Application No. 63/507,664, filed on Jun. 12, 2023, and entitled "HIGH SPEED OPTICAL RECEIVER MODULE." The disclosure of the prior application is considered part of and is incorporated by reference into this patent application.

BACKGROUND

An optical receiver system is a system that detects and converts optical signals into electrical signals, and may include components such as a two-dimensional grating coupler, a photodiode, and a transimpedance amplifier. Sometimes, the optical receiver system is part of an optical communication system (a fiber optic communication system, an optical wireless communication system, an optical local area network system, or a satellite communication system) that performs functions related to receiving and converting transmitted optical data for further processing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A-6D are a series of diagrams including example performance data related to an optical receiver system and one or one or more components described herein.

DETAILED DESCRIPTION

Figure 1:
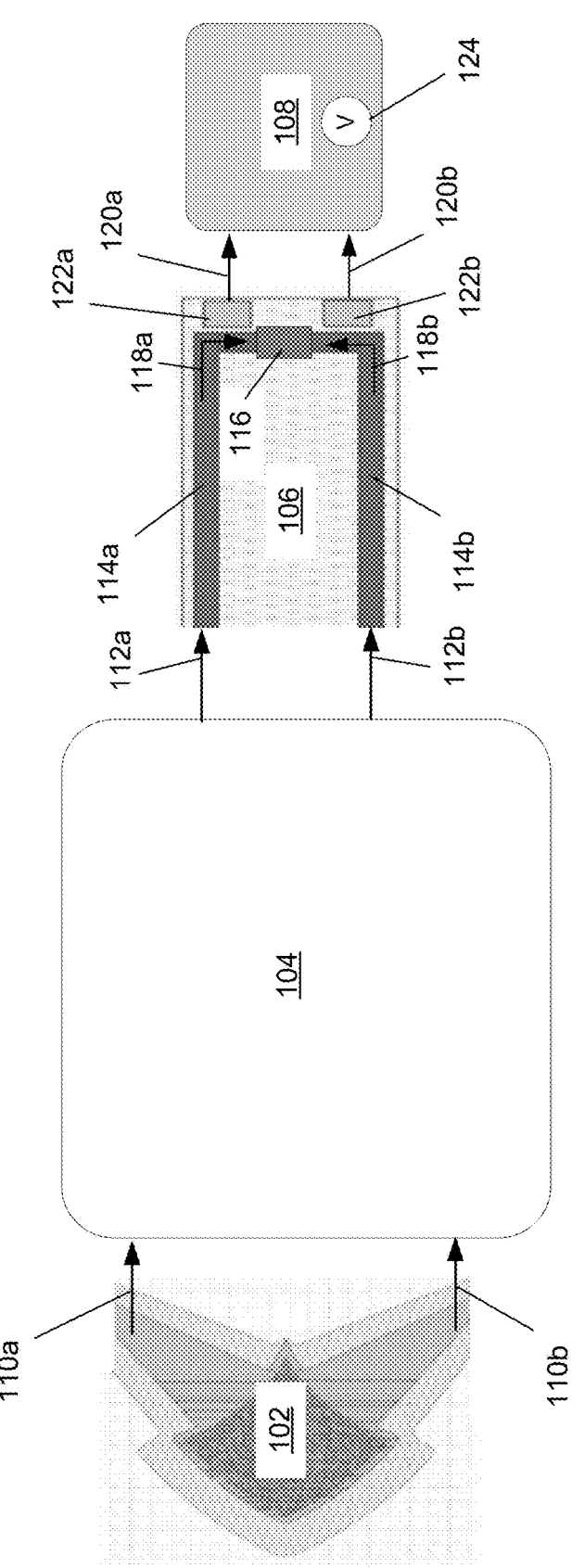
FIG. 1 is a diagram of an example high speed optical receiver system described herein.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

An optical receiver system may include a photodiode device and a two-dimensional grating coupler. In some cases, a performance of the optical receiver system degrades when incident light received into inputs of the photodiode device is mismatched. For example, outputs of the two-dimensional grating coupler may include mismatched light waves (light waves having different amplitudes, different wavelengths, or asynchronous phases, among other examples). The mismatched light waves may cause imbalances and/or increases in photocurrents within the photodiode device to reduce a performance (e.g., a bandwidth) of the optical receiver system.

Some implementations described herein provide an optical receiver system. The optical receiver system includes optical circuitry that may include a phase shifter device, a demultiplexer device, a power combiner device, and/or a power splitter device. Different combinations of such devices within the optical circuitry may balance and/or reduce photocurrents within the photodiode device to improve a performance (e.g., a bandwidth) of the optical receiver system relative to another optical receiver system that does not include the optical circuitry.

In this way, the optical receiver system may satisfy a performance threshold requirement for a market of high-performance optical communication systems and realize an increase in manufacturing yield and a reduction in field failures. Increasing the manufacturing yield and reducing the rate of field failures may save manufacturing costs and reduce an amount of resources (e.g., raw materials, semiconductor manufacturing tools, labor, and/or computing resources) needed to support the market of high-performance optical communication systems.

FIG. 1 is a diagram of an example optical receiver system 100 described herein. The optical receiver system 100 is configured to detect and convert optical signals into electrical signals. The optical receiver system 100 may be included as part of an optical communication system (a fiber optic communication system, an optical wireless communication system, an optical local area network system, or a satellite communication system, among other examples) that performs functions related to receiving and converting transmitted optical data for further processing.

The optical receiver system 100 of FIG. 1 includes a two-dimensional grating coupler device 102, an optical circuit 104, a photodiode device 106, and a transimpedance amplifier device 108. The two-dimensional grating coupler device 102, the optical circuit 104, and/or the photodiode device 106 may be coupled and/or connected using devices that are transmissive to light waves (e.g., fiber optic cables, optical connectors, and/or waveguides).

The two-dimensional grating coupler device 102 may receive light (e.g., electromagnetic waves) from an external optical medium (free space, waveguides, or fiber optic cables, among other examples) with another device that is transmissive to the light. In some implementations and based on patterns formed in surfaces of the two-dimensional grating coupler device 102, the two-dimensional grating coupler device 102 may output incident light 110a (e.g., first light waves) and incident light 110b (e.g., second light waves). In some implementations, the incident light 110a and the incident light 110b are mismatched (have different amplitudes, different wavelengths, and/or asynchronous phases, among other examples).

In some implementations, the incident light 110a and/or the incident light 110b are output from the two-dimensional grating coupler device 102 in a transverse electric (TE) mode. In the TE mode, a direction of the propagation of the incident light 110a and/or the incident light 110b is perpendicular to an electric field in the two-dimensional grating coupler device 102.

Alternatively, and in some implementations, the incident light 110a and/or the incident light 110b are output from the two-dimensional grating coupler device 102 in a transverse magnetic (TM) mode. In the TM mode, a direction of the propagation of the incident light 110a and/or the incident light 110b is perpendicular to a magnetic field in the two-dimensional grating coupler device 102.

The optical circuit 104, which may include one or more of a phase shifter device, a power combiner device, a power splitter device, and/or a demultiplexer device, may receive the incident light 110a and 110b from the two-dimensional grating coupler device 102. The optical circuit 104 may convert the incident light 110a and 110b into optical signals 112a and 112b.

As shown in FIG. 1, and in some implementations, the photodiode device 106 receives the optical signals 112a and 112b into respective waveguide structures 114a and 114b. The photodiode device 106 may include a photodiode region 116 (e.g., a region of a semiconductor material that is sensitive to light waves, such as germanium) that convert the optical signals 112a and 112b into respective photocurrents 118a and 118b. Based on the photocurrents 118a and 118b, the photodiode device 106 may output electrical currents 120a and 120b to the transimpedance amplifier device 108 through terminals 122a and 122b (e.g., positive and negative electrical terminals, respectively).

The transimpedance amplifier device 108 converts the electrical currents 120a and 120b into an output voltage 124 for use by the optical communication system including the optical receiver system 100. Fluctuations and/or variations in the electrical currents 120a and 120b (e.g., based on imbalances in, and/or magnitudes of, photocurrents 118a and 118b that may be caused by mismatched optical signals within the optical receiver system 100) can have several effects on performance of the transimpedance amplifier device 108, including introducing fluctuations and/or variations in the output voltage 124, distorting output signals from the transimpedance amplifier device 108, and/or limiting a bandwidth performance of the transimpedance amplifier device 108. Additionally, or alternatively, fluctuations and/or variations in the electrical currents 120a and 120b may introduce instabilities to feedback devices and/or control devices that may be included in the transimpedance amplifier device 108, among other examples. Such effects can cause a performance of the optical receiver system 100 (e.g., a speed or bandwidth in gigahertz (GHz)) to not satisfy a performance threshold for a high-performance optical communication system.

As described in greater detail in connection with FIGS. 2A-2C, and elsewhere herein, the optical circuit 104 may include one or more of a demultiplexer device, a power combiner device, and/or a power splitter device. Different combinations of such devices within the optical circuit 104 may balance and/or reduce magnitudes of the photocurrents 118a and 118b to improve a performance (e.g., a bandwidth) of the optical receiver system 100 relative to another optical receiver system that does not include the optical circuit 104.

Further, and as described in connection with FIGS. 2A-2C, FIG. 9, and elsewhere herein, an optical receiver system (e.g., the optical receiver system 100) may perform a series of operations. The series of operations includes receiving, by an optical circuit (e.g., the optical circuit 104) between a two-dimensional grating coupler device (e.g., the two-dimensional grating coupler device 102) and a photodiode device (e.g., the photodiode device 106), first incident light and second incident light (e.g., the incident light 110a and 110b). The series of operations includes converting, by the optical circuit and the photodiode device, the first incident light and the second incident light into respective time-fixed photocurrents (e.g., the photocurrents 118a and 118b). The series of operations includes providing, by the photodiode device to a transimpedance amplifier (e.g., the transimpedance amplifier device 108), electrical currents (e.g., the electrical currents 120a and 120b) based on the respective time-fixed photocurrents. The series of operations includes converting, by the transimpedance amplifier, the electrical currents to an output voltage (e.g., the output voltage 124) that is used by an optical communication system.

In this way, the optical receiver system may satisfy a performance threshold requirement for a market of high-performance optical communication systems and realize an increase in manufacturing yield and a reduction in field failures. Increasing the manufacturing yield and reducing the rate of field failures may save manufacturing costs and reduce an amount of resources (e.g., raw materials, semiconductor manufacturing tools, labor, and/or computing resources) needed to support the market of high-performance optical communication systems.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of FIG. 1 may perform one or more functions described as being performed by another set of devices of FIG. 1.

Figure 2A:
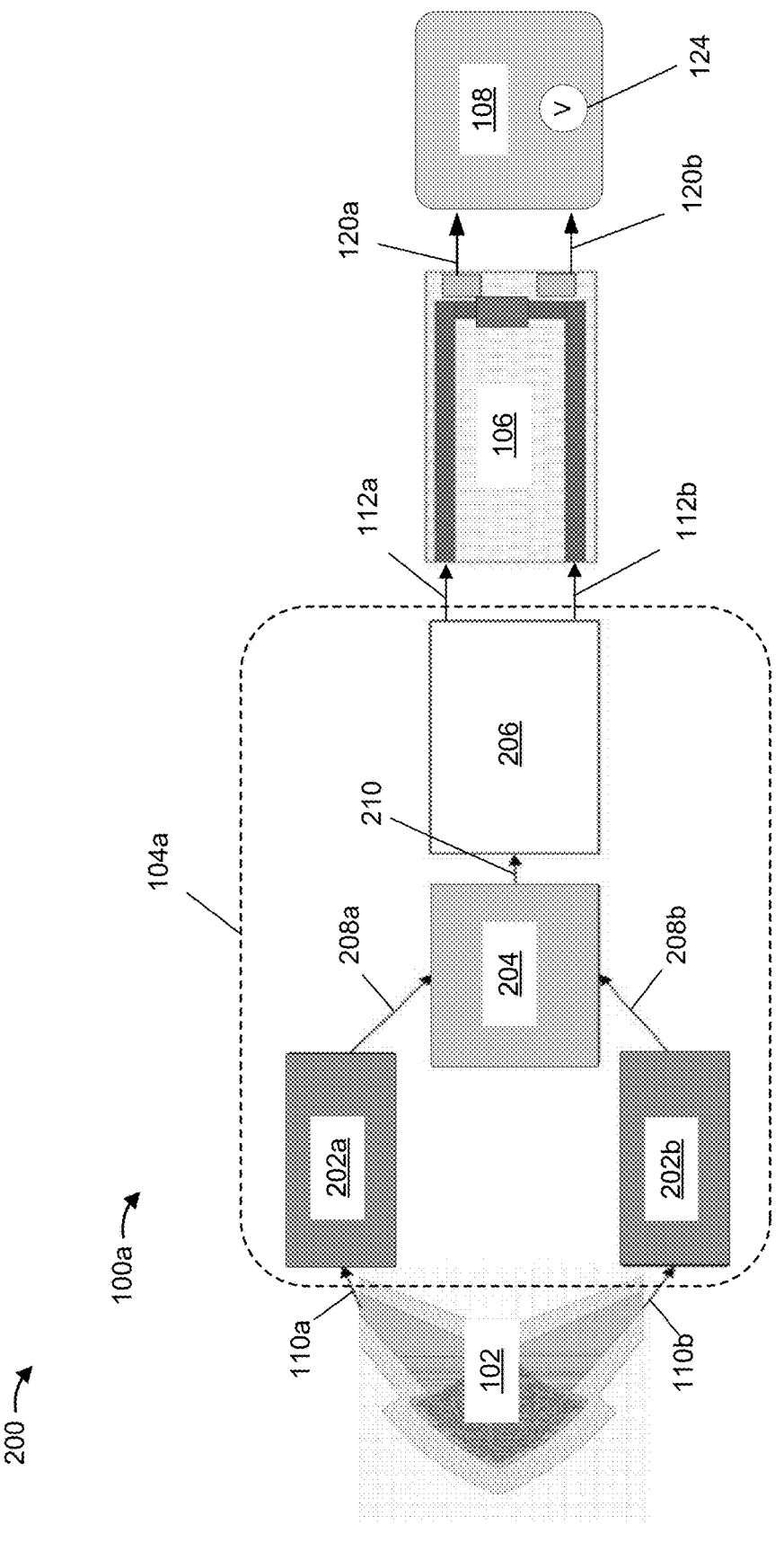
FIGS. 2A-2C are a series of diagrams of example implementations of an optical receiver system described herein.
Figure 2B:
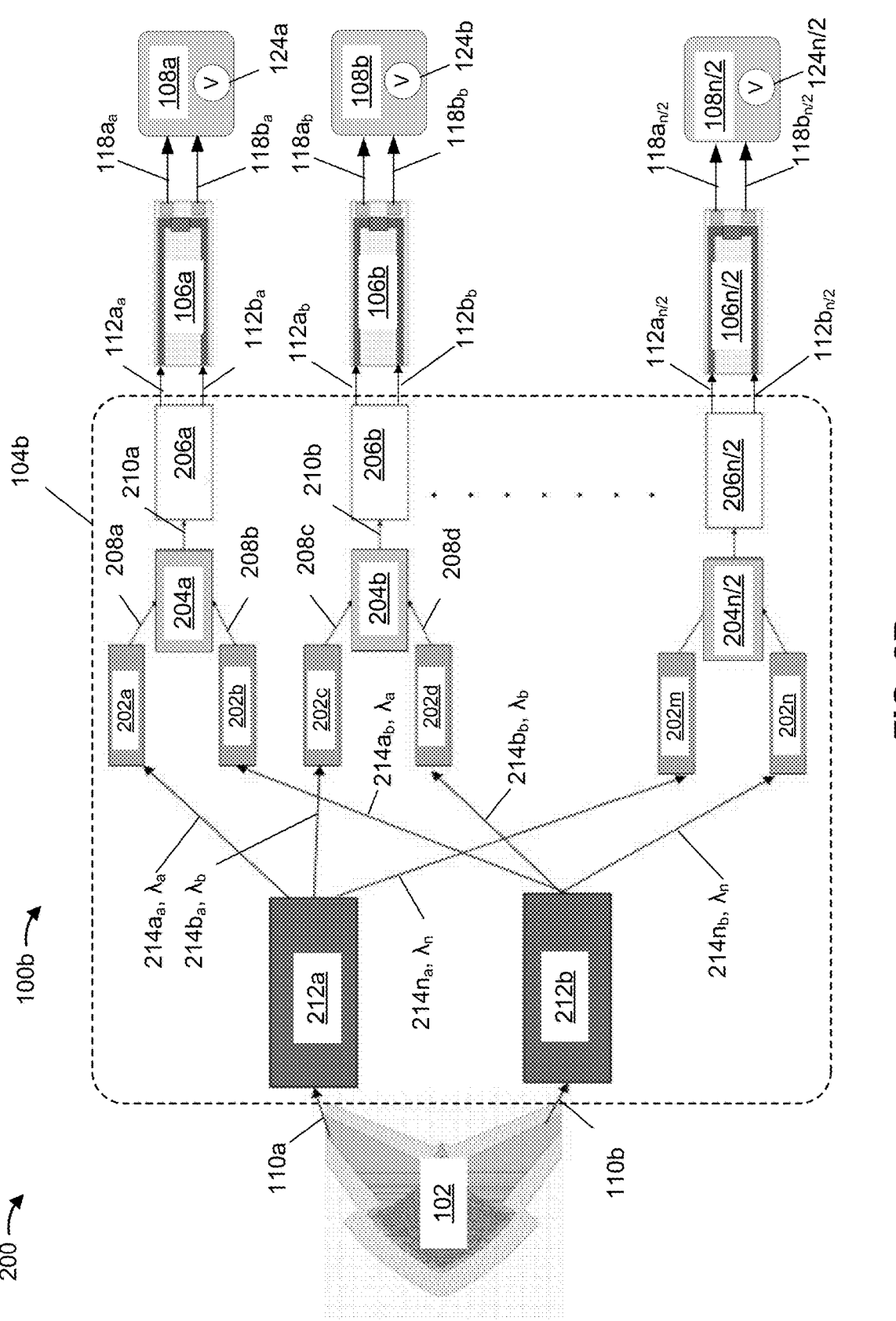
Figure 2C:
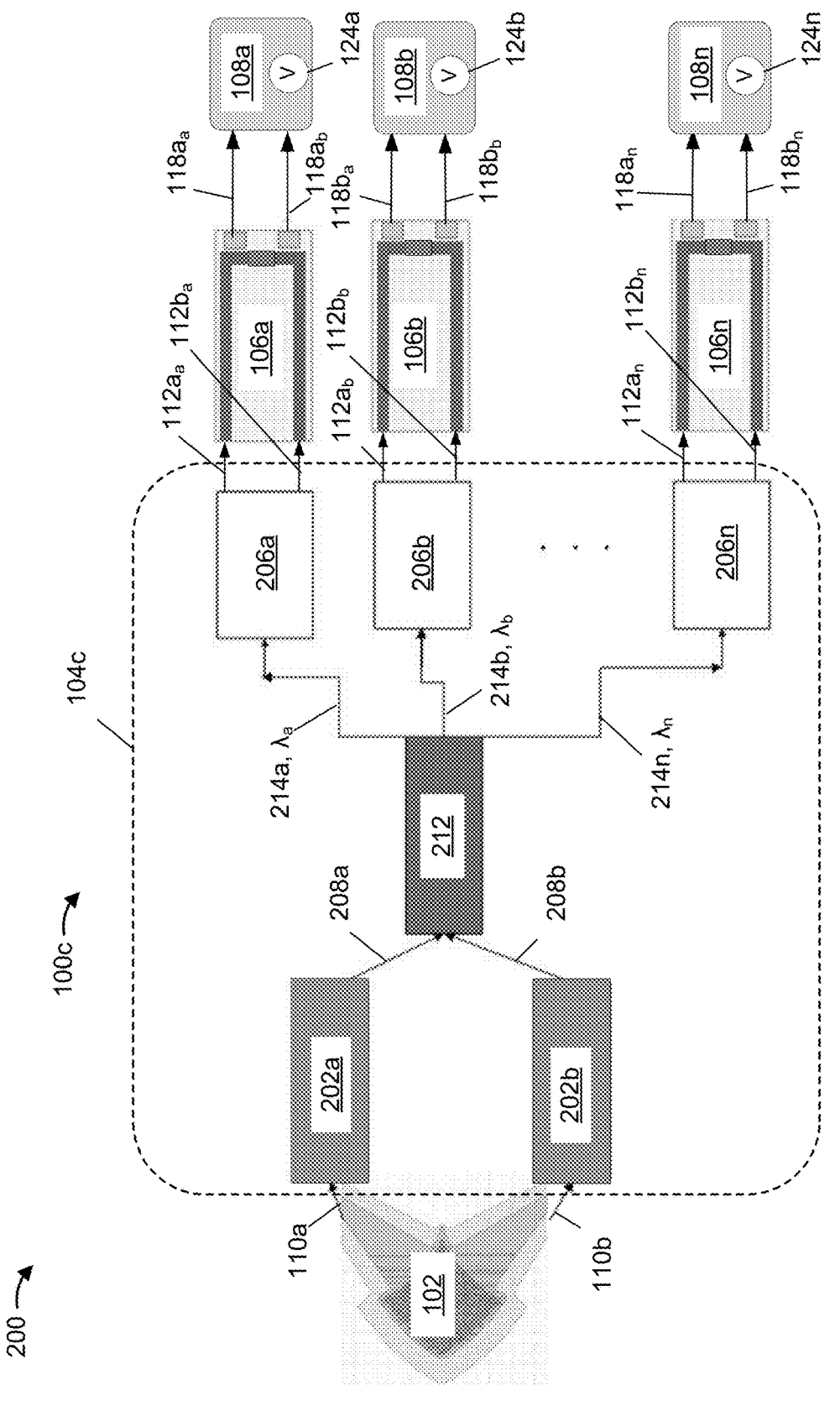

FIGS. 2A-2C are a series of diagrams 200 of example implementations of an optical receiver system described herein (e.g., the optical receiver system 100). In the example implementations, an optical circuit (e.g., the optical circuit 104) may include one or more of a phase shifter device, a power combiner device, a power splitter device, and/or a demultiplexer device.

The example implementation of FIG. 2A includes the optical circuit 104a. The optical circuit 104a may be included in the optical receiver system 100a, where the optical receiver system 100a includes a single transimpedance amplifier (e.g., the transimpedance amplifier device 108) that provides a single output voltage (e.g., the output voltage 124). Furthermore, and in the implementation of FIG. 2A, the incident light 110a and 110b include light waves of a single wavelength.

As shown in FIG. 2A, the optical circuit 104a includes phase shifter devices 202a and 202b. In some implementations, and as shown in FIG. 2A, inputs of the phase shifter devices 202a and 202b connect with respective outputs of the two-dimensional grating coupler device 102.

Each phase shifter device, of the phase shifter devices 202a and 202b, is a device that modifies a phase of a light wave passing through the phase shifter device. In other words, and as shown in FIG. 2A, the phase shifter devices 202a and 202b modify a relative timing or phase relationship between different optical signals that are received from the two-dimensional grating coupler device 102 (e.g., the incident light 110a and 110b).

Examples of the phase shifter devices 202a and 202b include a thermal phase shifter device, an electro-optic phase shifter device, an acousto-optic phase shifter device, a liquid crystal phase shifter device, and/or a waveguide-based phase shifter device. A selection of a type of device used for the phase shifter devices 202a and/or 202b may depend on a design requirement of the optical circuit 104a, such as a desired range of phases, a frequency or a speed, a power consumption, and/or an integration compatibility with other devices included in the optical circuit 104a, and/or a context in which the optical receiver system 100a is used.

As further shown in the example implementation of FIG. 2A, the optical circuit 104a includes a power combiner device 204. In some implementations, and as shown in FIG. 2A, inputs of the power combiner device 204 connect with respective outputs of the phase shifter devices 202a and 202b.

The power combiner device 204 is a device that merges optical signals into a single output. In other words, and as shown in FIG. 2A, the power combiner device 204 merges optical signals 208a and 208b (e.g., optical signals output by the phase shifter device 202a) into a single optical signal 210.

Examples of the power combiner device 204 include a fiber-based power combiner device, a coherent power combiner device, a free-space power combiner device, and/or a waveguide-based power combiner device. A selection of a type of device for the power combiner device 204 may depend on a design requirement of the optical circuit 104a, such as a power level of input signals, a desired efficiency, a wavelength range, and/or an integration compatibility with other devices included in the optical circuit 104a, and/or a context in which the optical receiver system 100a is used.

As further shown in the example implementation of FIG. 2A, the optical circuit 104a includes a power splitter device 206. In some implementations, and as shown in FIG. 2A, an input of the power splitter device 206 connects with an output of the power combiner device 204.

The power splitter device 206 (sometimes referred to as a beam splitter device or an optical splitter device) is a device that divides an optical signal into multiple output signals with reduced power. In other words, and as shown in FIG. 2A, the power splitter device 206 divides the optical signal 210 into the optical signals 112a and 112b.

Examples of the power splitter device 206 include a fiber-based power splitter device, a planar light wave circuit power splitter device, a free-space power splitter device, and/or a waveguide-based power splitter device. A selection of a type of device for the power splitter device 206 may depend on a design requirement of the optical circuit 104a, such as a desired splitting ratio, a wavelength range, a power level, and/or an integration compatibility with other devices included in the optical circuit 104a, and/or a context in which the optical receiver system 100a is used. Further, and in some implementations, the power splitter device 206 has a controllable splitting ratio (e.g., an adjustable splitting ratio) or a fixed splitting ratio.

In some implementations, the phase shifter devices 202a and 202b, the power combiner device 204, and the power splitter device 206 of FIG. 2A are combined on a single semiconductor die. Alternatively, and in some implementations, the phase shifter devices 202a and 202b, the power combiner device 204, and/or the power splitter device 206 are distributed across at least two semiconductor dies.

As described in connection with FIGS. 1, 2A, and elsewhere herein, an optical receiver system (e.g., the optical receiver system 100) includes a phase shifter device (e.g., the phase shifter device 202). The optical receiver system includes a power combiner device (e.g., the power combiner device 204) coupled with the phase shifter device. The optical receiver system includes a power splitter device (e.g., the power splitter device 206) coupled with the power combiner device. The optical receiver system includes a photodiode device (e.g., the photodiode device 106) coupled with the power splitter device.

The example implementation of FIG. 2B includes the optical circuit 104b. The optical circuit 104b may be included in the optical receiver system 100b, where the optical receiver system 100b includes multiple transimpedance amplifiers (e.g., the transimpedances amplifiers 108a-108n/2) that provide multiple output voltages (e.g., the output voltage 124a-124n/2) to components of a high-performance optical communication system. Furthermore, and in the implementation of FIG. 2B, the incident light 110a and 110b may include light waves of multiple wavelengths.

As shown in FIG. 2B, the optical circuit 104b includes demultiplexer devices 212a and 212b. In some implementations, and as shown in FIG. 2B, inputs of the demultiplexer devices 212a and 212b connect with respective outputs of the two-dimensional grating coupler device 102. In the implementation of FIG. 2B, the incident light 110a and 110b include multiple wavelengths.

Each of the demultiplexer devices 212a and 212b is a device that separates multiplexed optical signals carrying light waves of multiple wavelengths into individual optical signals carrying light waves of individual wavelengths. In other words, and as shown in FIG. 2B, the demultiplexer devices 212a and 212b separate the incident light 110a and 110b into optical signals $214a_a$-$214n_b$ (e.g., optical signals carrying light waves of respective, individual wavelengths $\lambda_a$-$\lambda_n$).

Examples of the demultiplexer devices 212a and 212b include a fiber-based demultiplexer device, a planar light wave circuit demultiplexer device, a free-space demultiplexer device, and/or a prism-based demultiplexer device. A selection of a type of device for the demultiplexer devices 212a and 212b may depend on a design requirement of the optical circuit 104b, such as a quantity of channels, a wavelength range, a channel spacing, and/or an integration compatibility with other devices included in the optical circuit 104a, and/or a context in which the optical receiver system 100b is used. Further, and in some implementations, the power splitter device 206 has a controllable splitting ratio or a fixed splitting ratio.

As further shown in the example implementation of FIG. 2B, the optical circuit 104b includes the phase shifter devices 202a-202n. In some implementations, and in contrast to the optical circuit 104a described in connection with FIG. 2A in which inputs of phase shifter devices (e.g., the phase shifter devices 202a and 202b) connect with respective outputs of the two-dimensional grating coupler device 102, inputs of the phase shifter devices 202a-202n connect with respective outputs of the demultiplexer devices 212a and 212b.

As further shown in the example implementation of FIG. 2B, the optical circuit 104b includes the power combiner devices 204a-204n/2. In some implementations, and as shown in FIG. 2B, inputs of the power combiner devices 204a-204n/2 connect with respective outputs of the phase shifter devices 202a-202n.

As further shown in the example implementation of FIG. 2B, the optical circuit 104b includes the power splitter devices 206a-206n/2. In some implementations, and as shown in FIG. 2B, inputs of the power splitter devices 206a-206n/2 connect with respective outputs of the power combiner devices 204a-204n/2.

The example implementation of FIG. 2C includes the optical circuit 104c. The optical circuit 104c may be included in the optical receiver system 100c, where the optical receiver system 100c includes multiple transimpedance amplifiers (e.g., the transimpedances amplifiers 108a-108n) that provide multiple output voltages (e.g., the output voltage 124a-124n). In FIG. 2C, and in contrast to the optical circuit 104a described in connection with FIG. 2A and the optical circuit 104b described in connection with FIG. 2B, the optical circuit 104c excludes power combiner devices (e.g., the power combiner device 204 and/or the power combiner devices 204a-204n/2). Furthermore, and in the implementation of FIG. 2C, the incident light 110a and 110b may include light waves of multiple wavelengths.

As shown in FIG. 2C, the optical circuit 104c includes the demultiplexer device 212. In some implementations, and in contrast to the optical circuit 104b of FIG. 2B in which inputs of the demultiplexer devices 212a and 212b connect with respective outputs of the two-dimensional grating coupler device 102, inputs of the demultiplexer device 212 of FIG. 2C connect with respective outputs of the phase shifter devices 202a and 202b.

As further shown in FIG. 2C, the optical circuit 104c includes the power splitter devices 206a-206n. In some implementations, and in contrast to the optical circuit 104b of FIG. 2B in which inputs of power splitter devices (e.g., the power splitter devices 206a-206n/2) connect with respective outputs of power combiner devices (e.g., the power combiner devices 204a-204n/2), inputs of the power splitter devices 206a-206n of FIG. 2C connect with respective outputs of the demultiplexer device 212.

In some implementations, the phase shifter devices 202, the power splitter devices 206, and the demultiplexer devices 212 of FIGS. 2B and 2C, and the power combiner devices 204 of FIGS. 2A and 2B, are on a single semiconductor die. Alternatively, and in some implementations, the phase shifter devices 202, the power splitter devices 206, and the demultiplexer devices 212 of FIGS. 2B and 2C, and/or the power combiner devices 204 of FIGS. 2A and 2B, are distributed across at least two semiconductor dies.

As described in connection with FIGS. 1, 2B, 2C, and elsewhere herein, an optical receiver system (e.g., the optical receiver system 100) includes a demultiplexer device (e.g., the demultiplexer device 212). The optical receiver system includes a phase shifter device (e.g., the phase shifter device 202) coupled with the demultiplexer device. The optical receiver system includes a power splitter device (e.g., the power splitter device 206). The optical receiver system includes a photodiode device (e.g., the photodiode device 106) coupled with the power splitter device.

The number and arrangement of devices shown in FIGS. 2A-2C are provided as one or more examples. In practice, there may be additional devices, fewer devices, different devices, or differently arranged devices than those shown in FIGS. 2A-2C. Additionally, or alternatively, a set of devices (e.g., one or more devices) of the example implementations of FIGS. 2A-2C may perform one or more functions described as being performed by another set of devices of the example implementations of FIGS. 2A-2C.

Figure 3A:
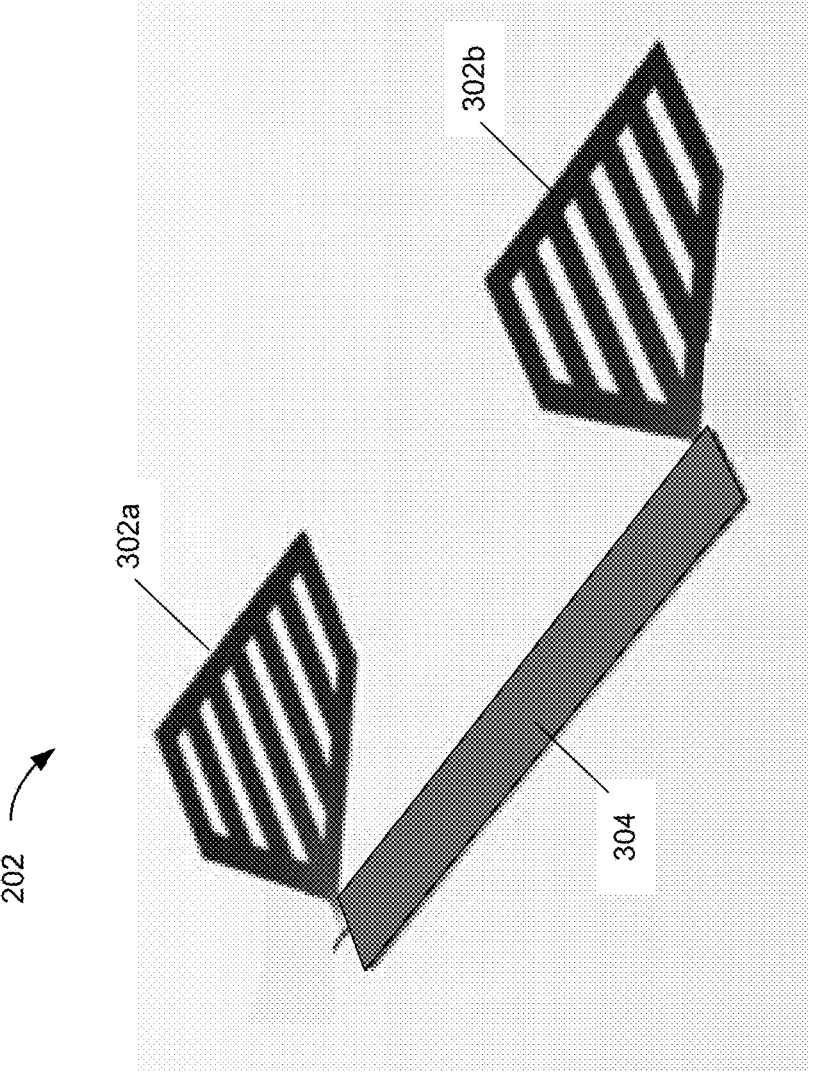
FIGS. 3A and 3B are diagrams related to an example phase shifter device described herein.
Figure 3B:
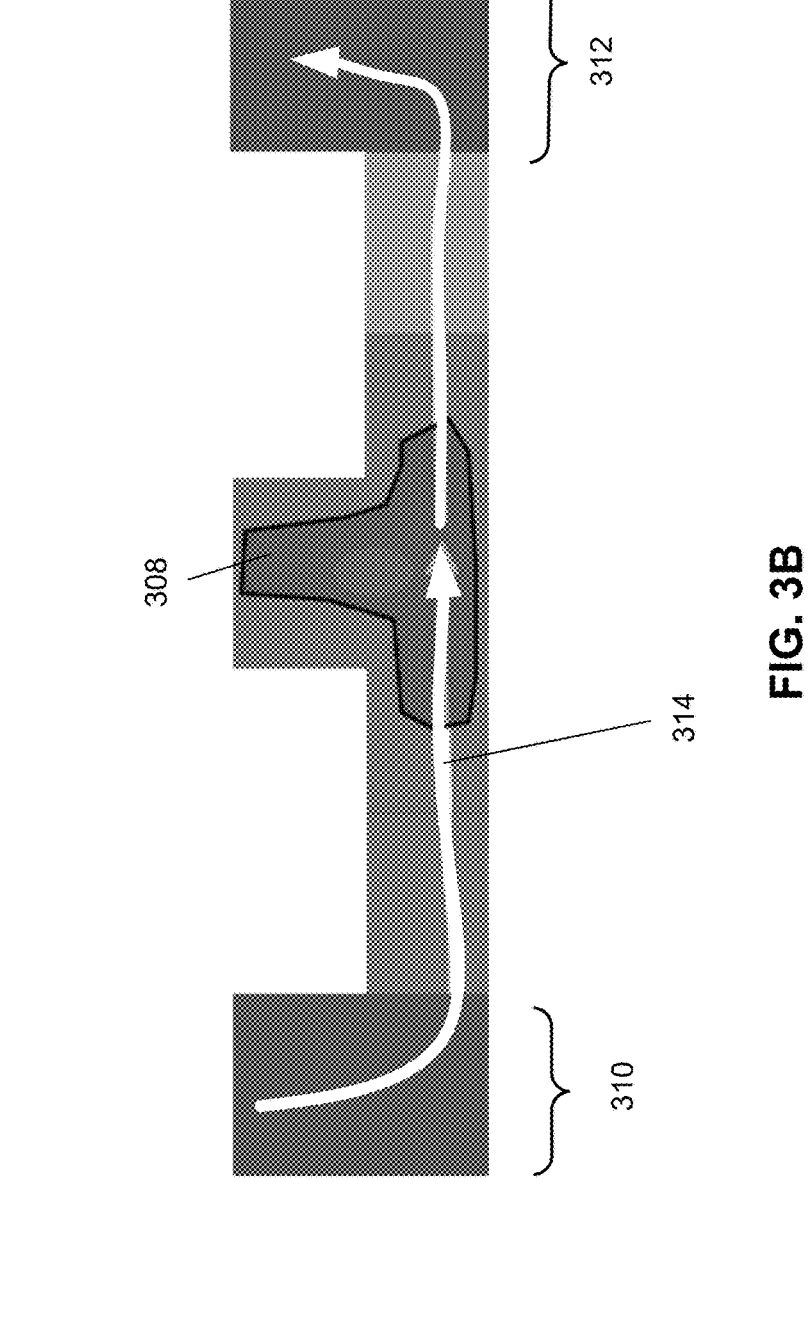

FIGS. 3A and 3B are diagrams 300 related to an example phase shifter device (e.g., the phase shifter device 202) described herein. Furthermore, the diagrams 300 of FIGS. 3A and 3B relate to a thermal phase shifter type of device.

As shown in FIG. 3A, the phase shifter device 202 may include an input 302a and an output 302b. The input 302a and the output 302b may be connected by a waveguide structure 304. In some implementations, the waveguide structure 304 includes a material with a high thermo-optic coefficient, such as a silicon material. As described in connection with FIG. 3B, and in some implementations, a thermal-induced phase change, free-carrier injection process is used to alter a refractive index of the waveguide structure 304, thereby allowing for precise control of a phase of an optical signal (e.g., a light wave) transmitted through the waveguide structure 304. In other words, the phase shifter device 202 of FIG. 3A may be used to synchronize incident light waves (e.g., the incident light 110a and 110b).

FIG. 3B shows an integrated circuit 306 that may be included in the phase shifter device 202 (e.g., as part of the waveguide structure 304). The integrated circuit 306 includes an intrinsic hot carrier injection region 308, a p-type region 310, and an n-type region 312.

The intrinsic hot carrier injection region 308 may be a region within the integrated circuit 306 in which carriers (e.g., electrons or electron holes) gain kinetic energy through an impact ionization mechanism or a tunneling mechanism. The p-type region 310 may be a region within the integrated circuit 306 that includes a p-type dopant (a concentration of approximately $4 \times 10^{17}$ boron (B) atoms per cubic centimeter, among other examples). In the p-type region 310, a majority of carriers may be electron holes. The n-type region 312 may be another region within the integrated circuit that includes an n-type dopant (a concentration of approximately $3 \times 10^{17}$ phosphorous (P) atoms per cubic centimeter, among other examples). In the n-type region 312, a majority of carriers may be electrons.

An electrical current multi-layer photodiode device 314 may be applied to the integrated circuit 306. In such a case, and within the intrinsic hot carrier injection region 308, carriers may gain sufficient kinetic energy to increase a temperature of the integrated circuit 306 (e.g., increase a temperature of the waveguide structure 304). Increasing the temperature of the waveguide structure 304 may alter a refractive index of the waveguide structure 304, allowing for precise control of a phase of an optical signal (e.g., a light wave) transmitted through the waveguide structure.

As indicated above, FIGS. 3A and 3B are provided as examples. Other examples (e.g., components and/or mechanisms used in the phase shifter device 202) may differ from what is described with regard to FIGS. 3A and 3B.

FIGS. 4A-4D are a series of diagrams 400 related to example components that may be included in power combiner devices and/or power splitter devices described herein. The components may be included in the power combiner device 204 and/or the power splitter device 206 of the optical circuit 104.

Figure 4A:
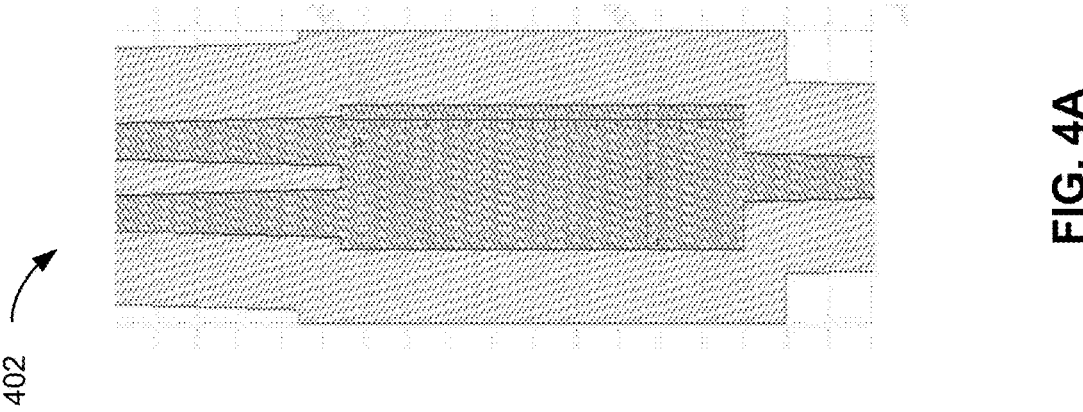
FIGS. 4A-4D are a series of diagrams related to example components that may be included in power combiner devices and/or power splitter devices described herein.

FIG. 4A shows an example implementation of a multimode interference (MMI) device 402 that may be included in the power combiner device 204. As shown in FIG. 4A, the MMI device 402 is configured as a 1×2 multimode interference device (e.g., the MMI device 402 includes a single input port and two output ports).

In some implementations, the MMI device 402 includes a waveguide-based structure that utilizes principles of multimode interference to achieve functionality. The MMI device 402 may include a multimode waveguide section (e.g., waveguides formed on a substrate of a semiconductor material) that splits or combines an input optical signal into two (or more) output optical signals, depending on a specific configuration.

Figure 4B:
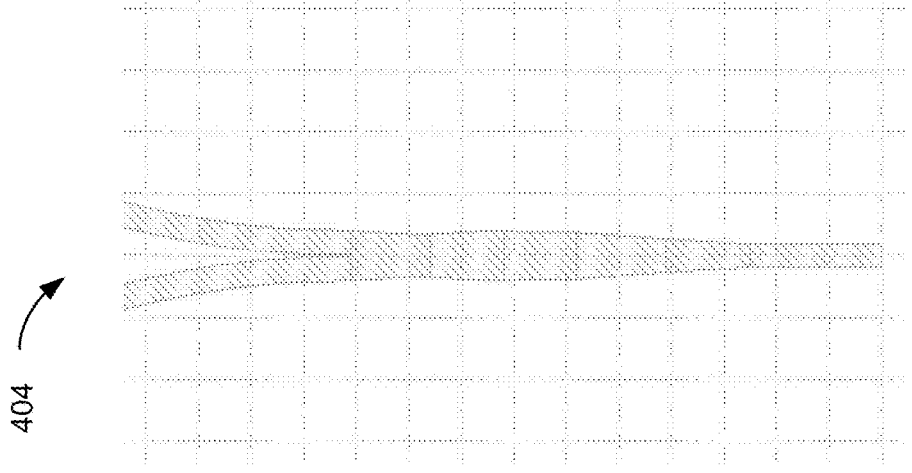

FIG. 4B shows an example implementation of a y-junction device 404 that may be included in the power combiner device 204. The y-junction device 404 (e.g., a y-branch splitter device) may split an input optical signal into two (or more) output optical signals, depending on a specific configuration.

In some implementations, the y-junction device 404 includes a waveguide-based structure on a substrate. The y-junction device 404 may include a single input waveguide that splits into multiple output waveguides in a y-shaped configuration. The y-junction structure enables an efficient division of an input optical signal between two (or more) output paths.

Figure 4C:
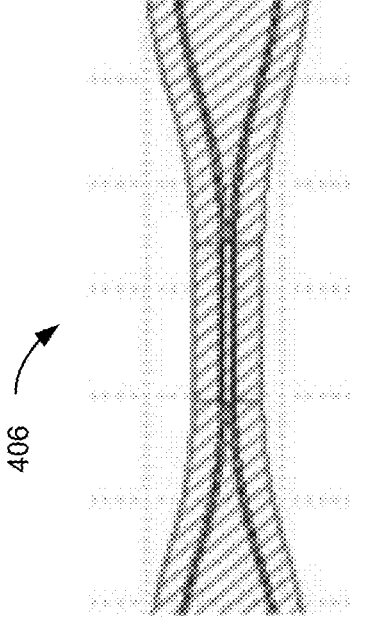

FIG. 4C shows an example implementation of a directional coupler device 406 that may be included in the power splitter device 206. The directional coupler device 406 may utilize principles of evanescent field coupling to achieve functionality.

In some implementations, the directional coupler device 406 includes waveguides to split or combine optical signals. In some implementations, the directional coupler device 406 includes optical fibers to split or combine optical signals.

As an example, and within the directional coupler device 406, two waveguides or two optical fibers may be close in proximity, allowing evanescent coupling of energy (e.g., light waves) within the directional coupler device 406. For example, an optical signal may enter an input port of the directional coupler device 406 and be split into two paths (e.g., a first path associated with the input port of the directional coupler device 406 and a second, adjacent path associated with an output port of the directional coupler device 406). Within a coupling region of the directional coupler device 406 (e.g., adjacent waveguides or optical fibers included along the first and second paths), energy may be transferred.

Figure 4D:
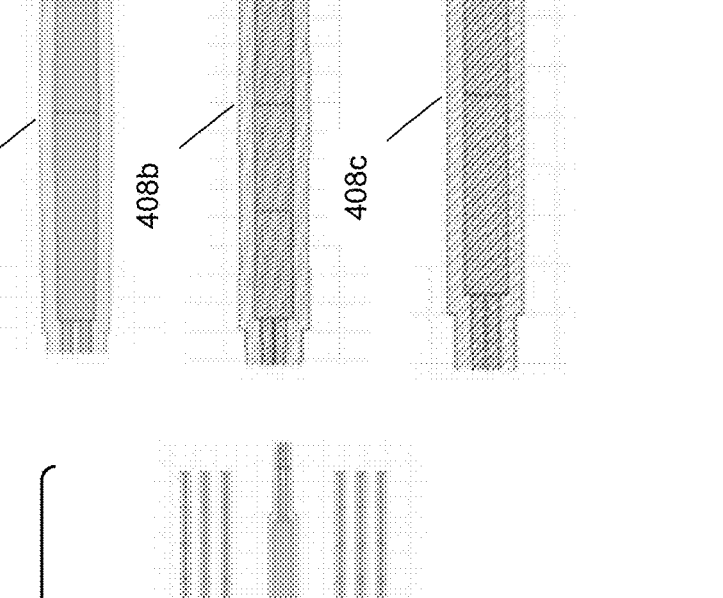

FIG. 4D shows example implementations of an MMI device 408 that may be included in the power splitter device 206. As shown in FIG. 4D, the MMI device 408 is configured as a 2×2 device (e.g., the MMI device 408 includes a quantity of two input ports and two output ports). The MMI devices 408a-408c show different, example implementations of input ports, output ports, and waveguide structures that may be included in the MMI device 408.

As an example, the two input ports of the MMI device 408a are separated along a horizontal direction and connect with a first waveguide structure. The MMI device 408a further includes a second waveguide structure that is adjacent to and connects with the first waveguide structure. Furthermore, the two output ports of the MMI device 408a are separated along the horizontal direction and connect with the second waveguide structure.

As another example, the two input ports of the MMI device 408b are joined along a horizontal direction and connect with a first waveguide structure. The MMI device 408b further includes a second waveguide structure that is adjacent to and connects with the first waveguide structure, a third waveguide structure that is adjacent to and connects with the second waveguide structure, and a fourth waveguide structure that is adjacent to and connects with the third waveguide structure. Furthermore, the two output ports of the MMI device 408b are joined along the horizontal direction and connect with the fourth waveguide structure.

As another example, the two input ports of the MMI device 408c are joined along a horizontal direction and connect with a first waveguide structure. The MMI device 408c further includes a second waveguide structure that is adjacent to and connects with the first waveguide structure. Furthermore, the two output ports of the MMI device 408c are joined along the horizontal direction and connect with the second waveguide structure.

As indicated above, FIGS. 4A-4D are provided as one or more examples. Other examples (e.g., components and/or arrangements of components that may be included in power combiner device 204 and/or the power splitter device 206) may differ from what is described with regard to FIGS. 4A-4D.

Figure 5A:
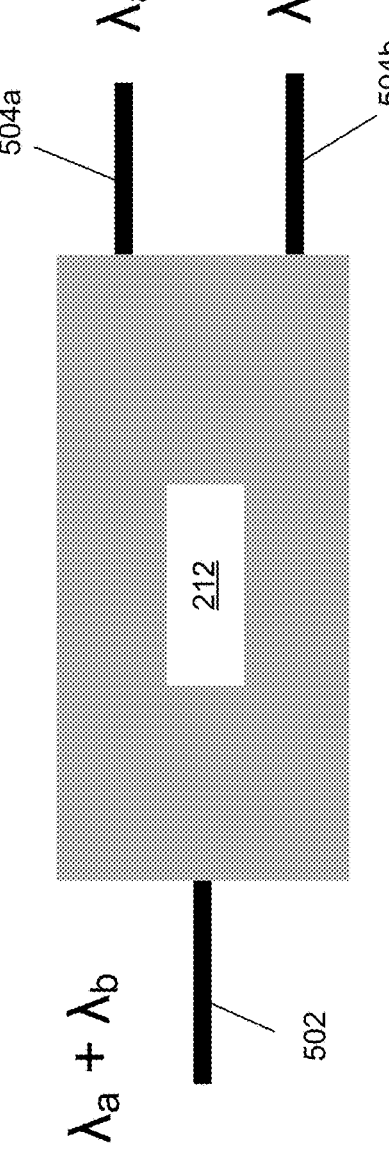
FIGS. 5A and 5B are diagrams related to an example demultiplexer device described herein.
Figure 5B:
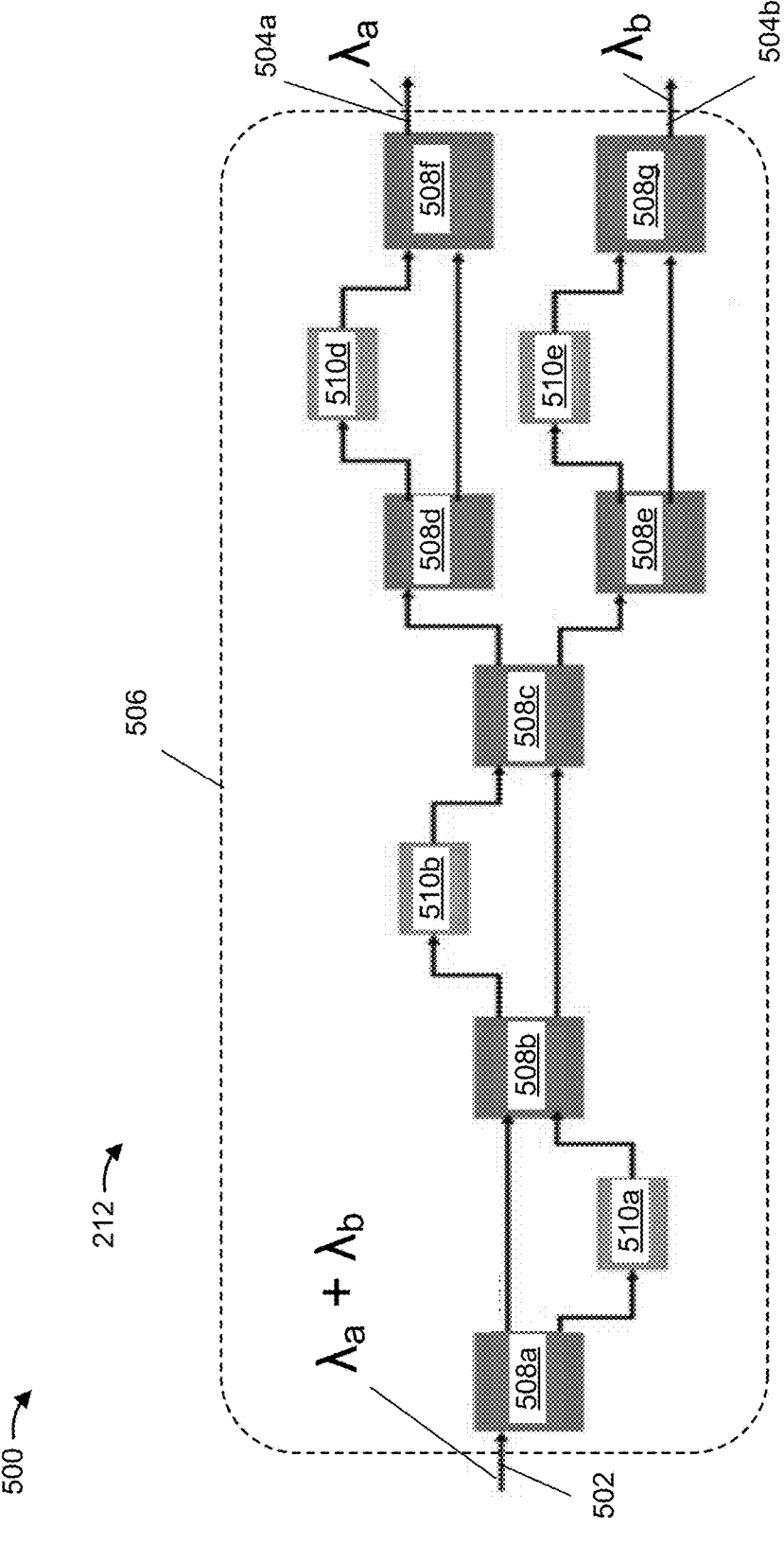

FIGS. 5A and 5B are an example implementation 500 of a demultiplexer device described herein. The demultiplexer device of the implementation 500 may correspond to the demultiplexer device 212 in the optical circuit 104.

As shown in FIG. 5A, the demultiplexer device 212 includes an input 502. The input 502 may be configured to receive an optical signal (e.g., a light wave) including light having a combination of wavelengths (e.g., light having a wavelength 2a and light having a wavelength 2b). The demultiplexer device 212 further includes an output 504a configured for outputting an optical signal having the wavelength 2a and an output 504b configured for outputting an optical signal having the wavelength 2b.

FIG. 5B shows an example functional block diagram 506 of the demultiplexer device 212. As shown in FIG. 5B, the functional block diagram 506 includes a combination of MMI devices 508a-508g. In some implementations, an arrangement of the MMI devices 508a-508g in the functional block diagram 506 is referred to as a 2×2 MMI stacking optical circuit.

In some implementations, each of the MMI devices 508a-508g includes an implementation of a power splitter device (e.g., the power splitter device 206 as described in connection with FIGS. 4A-4D). In such implementations, each power splitter device of the MMI devices 508a-508g may have a different, respective power splitting ratio. In other such implementations, one or more power splitter devices of the MMI devices 508a-508g may have a different, respective power splitting ratio than one or more other power splitter devices of the MMI devices 508a-508g.

In some implementations, outputs of one or more of the MMI devices 508a-508g may correspond to different degrees of an insertion loss (e.g., different degrees of an insertion loss in decibels (dB)) associated with each of the MMI devices 508a-508g. For example, an output of the MMI device 508a may correspond to an approximate insertion loss 510a associated with the MMI device 508a, an output of the MMI device 508b may correspond to an approximate insertion loss 510b associated with the MMI device 508b, an output of the MMI device 508d may correspond to an approximate insertion loss 510d associated with the MMI device 508d, and an output of the MMI device 508e may correspond to an insertion loss 510e associated with the MMI device 508c.

The insertion losses 510a, 510b, 510d, and/or 510e may represent differences in power between input and output signals of the MMI devices 508a, 508b, 508d, and/or 508c. The differences in power between the input and output signals of the MMI devices 508a, 508b, 508d, and/or 508e may be due to optical power that is lost or attenuated due to various factors, including power splitting ratios, imperfections, scattering, reflections, or absorption associated with the MMI devices 508a, 508b, 508d, and/or 508c.

As indicated above, FIGS. 5A and 5B are provided as examples. Other examples (e.g., components and/or arrangements of components that may be included in the demultiplexer device 212) may differ from what is described with regard to FIGS. 5A and 5B.

FIGS. 6A-6D are a series of diagrams 600 including example performance data related to an optical receiver system and one or one or more components described herein. The example performance data includes performance data related to the optical receiver system 100 described in connection with FIGS. 1 and 2A-2C, the directional coupler device 406 described in connection with FIG. 4C, the MMI device 408 described in connection with FIG. 4D, and the demultiplexer device 212 described in connection with FIGS. 2A-2C, 5A, and 5B.

Figure 6A:
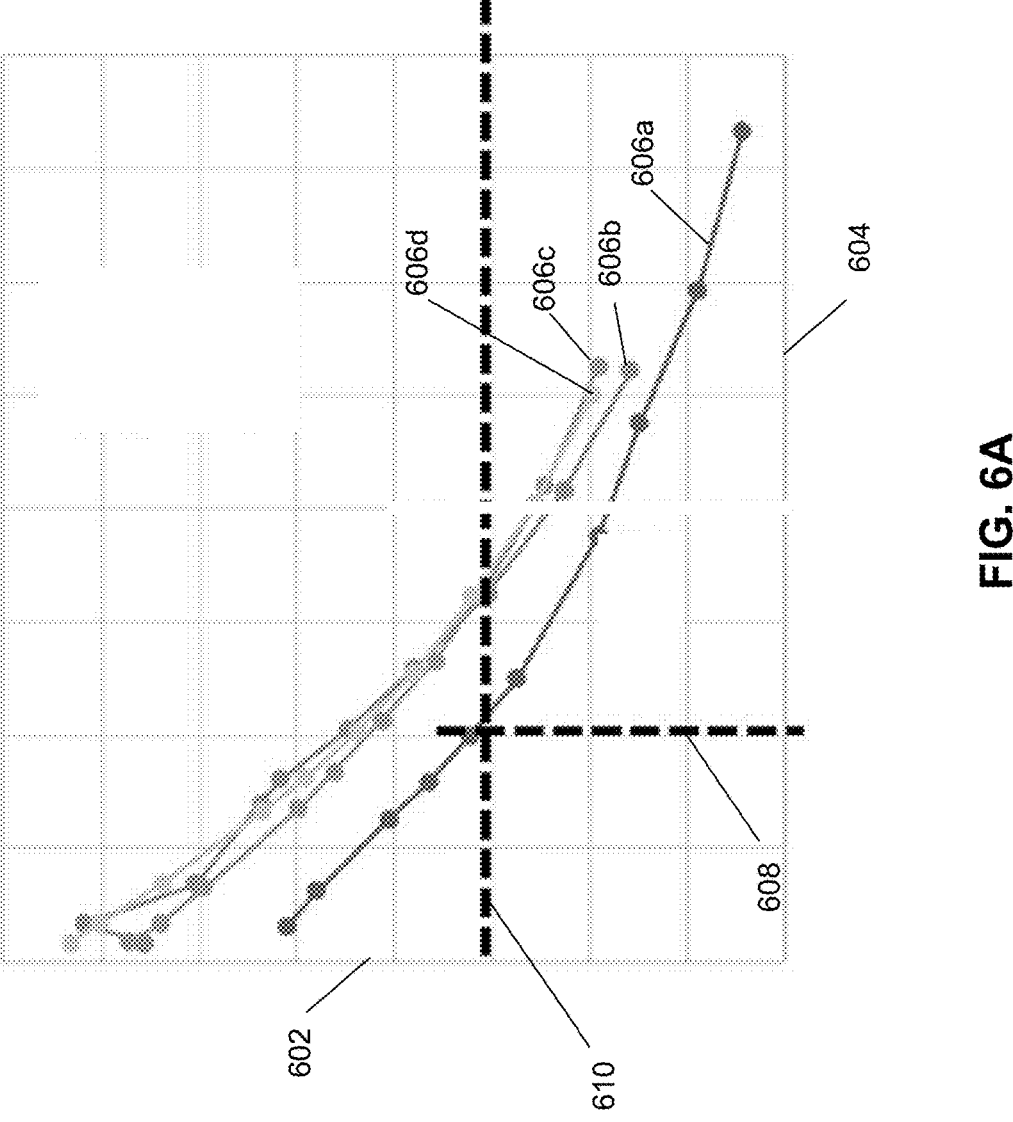

FIG. 6A shows an example relationship of a speed 602 of an optical receiver system (e.g., a speed in GHz of the optical receiver system 100) versus a received strength signal indicator (RSSI) 604 for one or more integrated circuit dies 606a-606d. In FIG. 6A, the integrated circuit die 606a may correspond to an integrated circuit die including a photodiode structure (e.g., the photodiode structure 106), and the RSSI 604 may correspond to electrical outputs from the photodiode structure to a transimpedance amplifier (e.g., the output electrical currents 120a and/or 120b from the photodiode device 106, in microamperes (μA), to the transimpedance amplifier device 108). Furthermore, FIG. 6 reflects performance data where the optical receiver system includes an optical circuit (e.g., the optical circuit 104) processing optical signals that may have a strength of approximately 3 dB.

As described in connection with FIGS. 1-5B, a configuration of the optical circuit and/or the photodiode may provide time-fixed electrical currents to the transimpedance amplifier device. For example, a configuration of the optical circuit may split power (e.g., electrical currents) from the photodiode at a ratio of approximately 1:1 (e.g., balance the electrical currents 120a and 120b at approximately 50% each) to provide time fixed-electrical currents 608 of approximately 400 μA and operate the optical receiver system at a fixed speed 610 of approximately 60 GHZ. However, other values and ranges for the time-fixed electrical currents 608 from the photodiode and/or the fixed speed 610 of the optical receiver system are within the scope of the present disclosure.

FIG. 6B shows an example relationship between a wavelength 612 and a coupling ratio 614 of a directional coupling device (e.g., the directional coupler device 406). As shown in FIG. 6B, the coupling ratio 614 is quantified in terms of a median 616 and a standard deviation 618 for three example wavelengths (e.g., $\lambda_1$, $\lambda_2$, and $\lambda_3$).

The directional coupler device 406 of FIG. 6B may have a power splitting ratio (e.g., a coupling ratio) of approximately 1:1 (e.g., approximately 50%). As shown in FIG. 6B, the median 616 and the standard deviation 618 may vary for each of three wavelengths $\lambda_a$, $\lambda_b$, and $\lambda_c$. In some implementations, a power splitting ratio within an optical circuit (e.g., the optical circuit 104) is controllable (e.g., tuned) by matching the directional coupler device 406 with one of the wavelengths 21, 22, and 23.

FIG. 6C shows an example relationship between a wavelength 612 and a coupling ratio 614 of an MMI device (e.g., the MMI devices 408a-408c). As shown in FIG. 6C, the coupling ratio 614 is quantified in terms of a median 616 and a standard deviation 618 for three example wavelengths (e.g., $\lambda_1$, $\lambda_2$, and $\lambda_3$.)

The MMI devices 408a-408c of FIG. 6C may be configured for a variety of coupling ratios 612. As shown in FIG. 6C, and for each of the coupling ratios 614, the median 616 and the standard deviation 618 may vary for each of three wavelengths 21, 22, and 23. In some implementations, a power splitting ratio within an optical circuit (e.g., the optical circuit 104) is controllable (e.g., tuned) by matching one of the MMI devices 408a-408c having a selected power splitting ratio with one of the wavelengths $\lambda_1$, $\lambda_2$, and $\lambda_3$.

Figure 6D:
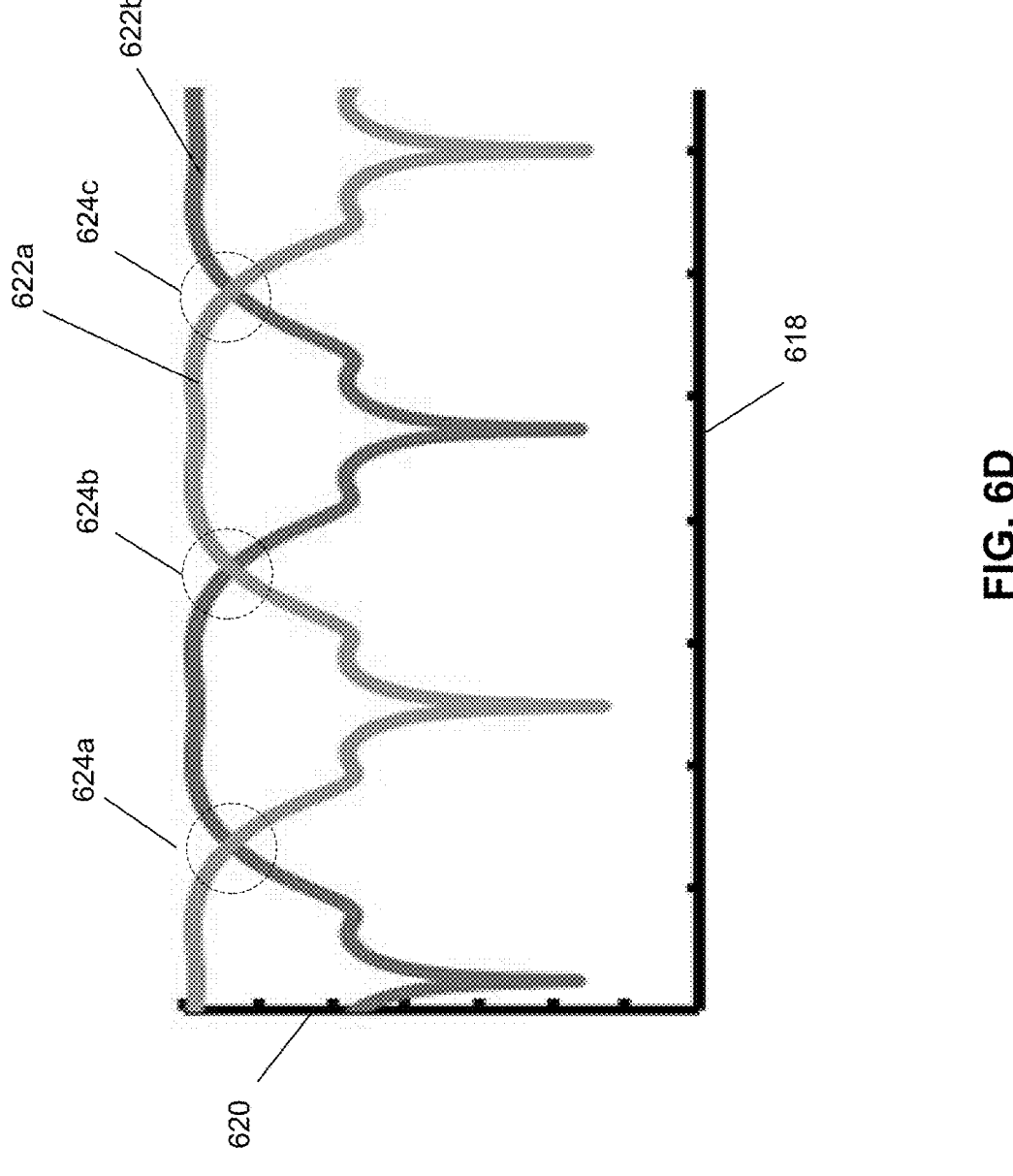

FIG. 6D shows example simulation data for an implementation of a demultiplexer device (e.g., the implementation of the demultiplexer device 212 described in connection with FIG. 5B, including the functional block diagram 506).

The simulation data of FIG. 6D includes an example relationship between a wavelength 618 of an optical signal within the demultiplexer device (e.g., a wavelength in nanometers) and a magnitude of an insertion loss 620 (e.g., a magnitude in decibels (dB)) for an MMI device (e.g., one or more of the MMI devices 508a, 508b, 508d, and/or 508c).

In FIG. 6D, data 622a may correspond to an output of the MMI device 508d (e.g., the insertion loss 510d for optical signals of different wavelengths transmitted through the MMI device 508d). Furthermore, and in FIG. 6D, data 622b may correspond to an output of the MMI device 508e (e.g., the insertion loss 510e for optical signals of different wavelengths transmitted through the MMI device 508c).

As shown in FIG. 6D, the implementation of the demultiplexer device may include minimal, aggregate insertion losses (e.g., highlighted by the crossover points 624a-624c) at repeating (e.g., periodic) wavelength intervals.

As indicated above, FIGS. 6A-6D are provided as one or more examples. Other examples (e.g., performance data that may be related to one or more components of the optical circuit 104) may differ from what is described with regard to FIGS. 6A-6D.

Figure 7:
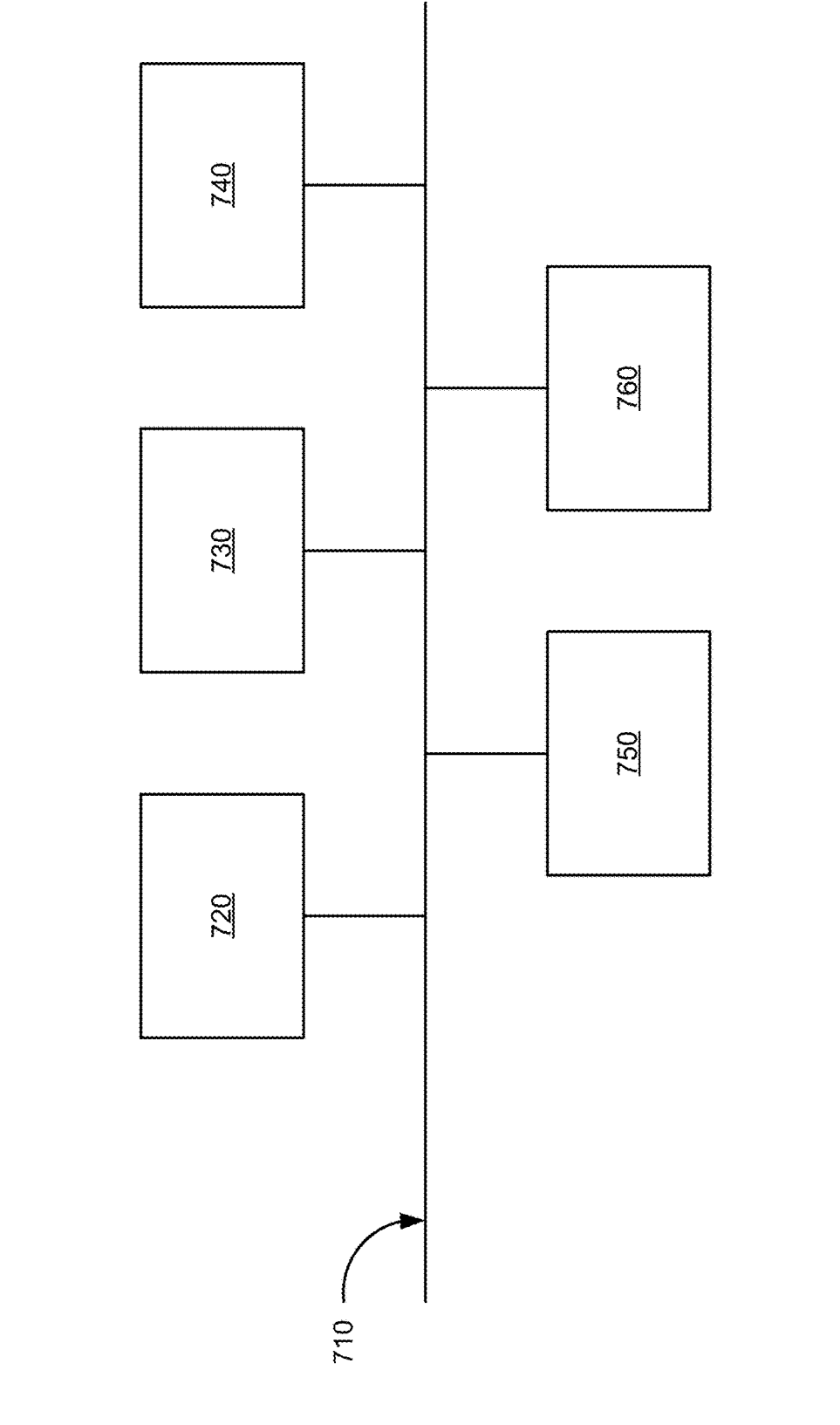
FIG. 7 is a diagram of example components of one or more devices that may be included as part of a high speed optical receiver system described herein.

FIG. 7 is a diagram of an example device 700 that may be included as part of an optical receiver system described herein (e.g., the optical receiver system 100, including a two-dimensional grating coupler device (e.g., the two-dimensional grating coupler device 102, an optical circuit (e.g., the optical circuit 104), and a photodiode device (e.g., the photodiode device 106). In some implementations, the device 700 is included as part of a device or a group of devices included in or separate from the optical circuit, including one or more of a phase shifter device (e.g., the phase shifter device 202), a power combiner device (e.g., the power combiner device 204), a power splitter device (e.g., the power splitter device 206), and/or a demultiplexer device (e.g., the demultiplexer device 212). As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrating circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hard-wired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
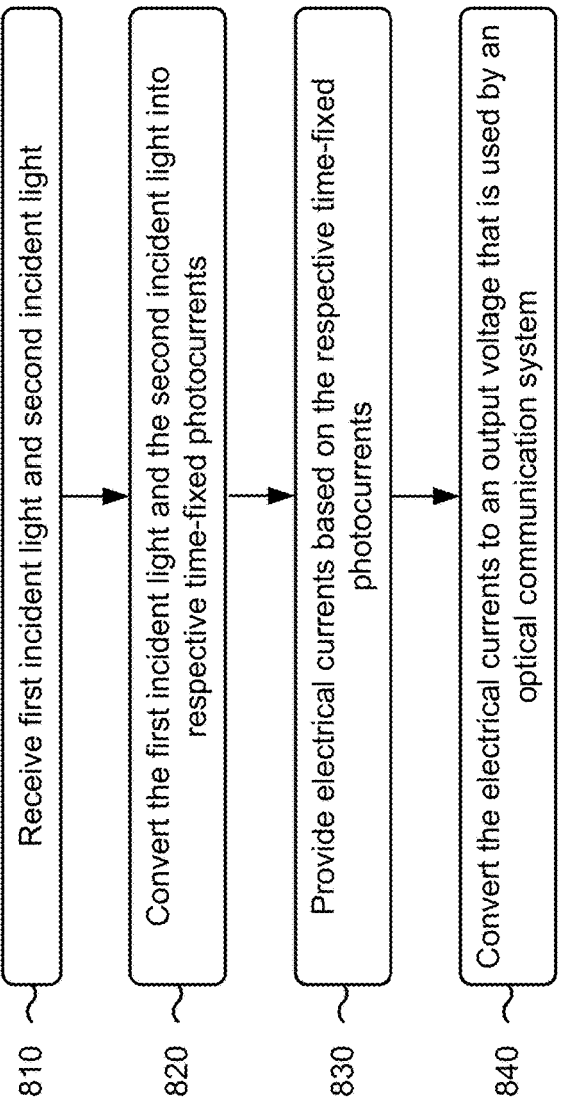
FIG. 8 is a flowchart of an example process performed by an optical receiver system described herein.

FIG. 8 is a flowchart of an example process performed by an optical receiver system (e.g., the optical receiver system 100) described herein. In some implementations, one or more process blocks of FIG. 8 are performed by another device or a group of devices separate from or included in the optical receiver system, such as two-dimensional grating coupler device (e.g., the two-dimensional grating coupler device 102), an optical circuit (e.g., the optical circuit 104), and/or a photodiode device (e.g., the photodiode device 106). In some implementations, or more process blocks of FIG. 8 are performed by another device or group of devices separate from or included in the optical circuit, including one or more of a phase shifter device (e.g., the phase shifter device 202), a power combiner device (e.g., the power combiner device 204), a power splitter device (e.g., the power splitter device 206), and/or a demultiplexer device (e.g., the demultiplexer device 212). Additionally, or alternatively, one or more process blocks of FIG. 8 may be performed by one or more components of device 700, such as processor 720, memory 730, input component 740, output component 750, and/or communication component 760.

As shown in FIG. 8, process 800 may include receiving first incident light and second incident light (block 810). For example, an optical circuit (e.g., the optical circuit 104) between a two-dimensional grating coupler (e.g., the two-dimensional grating coupler device 102) and a photodiode device (e.g., the photodiode device 106) may receive first incident light (e.g., the incident light 110*a*) and second incident light (e.g., the incident light 110*b*), as described above.

As further shown in FIG. 8, process 800 may include converting the first incident light and the second incident light into respective time-fixed photocurrents (block 820). For example, the optical circuit and the photodiode device may convert the first incident light and the second incident light into respective time-fixed photocurrents (e.g., the photocurrents 118*a* and 118*b*), as described above.

As further shown in FIG. 8, process 800 may include providing electrical currents based on the respective time-fixed photocurrents (block 830). For example, the photodiode device may provide electrical currents (e.g., the electrical currents 120*a* and 120*b*) to a transimpedance amplifier (e.g., the transimpedance amplifier device 108) based on the respective time-fixed photocurrents, as described above.

As further shown in FIG. 8, process 800 may include converting the electrical currents to an output voltage that is used by an optical communication system (block 840). For example, the transimpedance amplifier may convert the electrical currents to an output voltage (e.g., the output voltage 124) that is used by an optical communication system, as described above.

Process 800 may include additional implementations, such as any single implementation or any combination of implementations described below and/or in connection with one or more other processes described elsewhere herein.

In a first implementation, and as described in connection with FIG. 2A, the first incident light and the second incident light include light waves of a single wavelength, and converting the first incident light and the second incident light into respective time fixed photocurrents includes transmitting the first incident light and the second incident light through respective phase shifter devices (e.g., the phase shifter devices 202*a* and 202*b*), transmitting outputs from the respective phase shifter devices (e.g., the optical signals 208*a* and 208*b*) through a power combiner device (e.g., the power combiner device 204) and transmitting an output from the power combiner device (e.g., the optical signal 210) through a power splitter device having a controllable power splitting ratio (e.g., the power splitter device 206).

In a second implementation, alone or in combination with the first implementation and as described in connection with FIG. 2B, the first incident light and the second incident light include light waves of multiple wavelengths, and converting the first incident light and the second incident light into respective time fixed photocurrents includes transmitting the first incident light through a first demultiplexer device (e.g., the demultiplexer device 212a), transmitting the second incident light through a second demultiplexer device (e.g., the demultiplexer device 212b), transmitting outputs of a same wavelength from the first demultiplexer device and the second demultiplexer device (e.g., the optical signals $214a_a$ and $214a_b$ of the wavelength $\lambda_a$) through respective phase shifter devices (e.g., the phase shifter devices 202a and 202b), transmitting outputs from the respective phase shifter devices (e.g., the optical signals 208a and 208b) through a power combiner device (e.g., the power combiner device 204a) and transmitting an output (e.g., the optical signal 210a) from the power combiner device through a power splitter device having a controllable power splitting ratio (e.g., the power splitter device 206a).

In a third implementation, alone or in combination with one or more of the first and second implementations and as described in connection with FIG. 2C, the first incident light and the second incident light include light waves of multiple wavelengths, and converting the first incident light and the second incident light into respective time fixed photocurrents includes transmitting the first incident light and the second incident light through respective phase shifter devices (e.g., the phase shifter devices 202a and 202b), transmitting outputs from the respective phase shifter devices (e.g., the optical signals 208a and 208b) to a demultiplexer device (e.g., the demultiplexer device 212), transmitting an output of a first wavelength from the demultiplexer device (e.g., the optical signal 214a of the of the wavelength 2a) through a first power splitter device having a first controllable power splitting ratio (e.g., the power splitter device 206a), and transmitting an output of a second wavelength from the demultiplexer device (e.g., the optical signal 214b of the of the wavelength 2b) through a second power splitter device) having a second controllable power splitting ratio (e.g., the power splitter device 206b).

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

Some implementations described herein provide an optical receiver system. The optical receiver system includes optical circuitry that may include a phase shifter device, a demultiplexer device, a power combiner device, and/or a power splitter device. Different combinations of such devices within the optical circuitry may balance and/or reduce photocurrents within the photodiode device to improve a performance (e.g., a bandwidth) of the optical receiver system relative to another optical receiver system that does not include the optical circuitry.

In this way, the optical receiver system may satisfy a performance threshold requirement for a market of high-performance optical communication systems and realize an increase in manufacturing yield and a reduction infield failures. Increasing the manufacturing yield and reducing the rate of field failures may save manufacturing costs and reduce an amount of resources (e.g., raw materials, semiconductor manufacturing tools, labor, and/or computing resources) needed to support the market of high-performance optical communication systems.

As described in greater detail above, some implementations described herein provide an optical receiver system. The optical receiver system includes a phase shifter device. The optical receiver system includes a power combiner device coupled with the phase shifter device. The optical receiver system includes a power splitter device coupled with the power combiner device. The optical receiver system includes a photodiode device coupled with the power splitter device.

As described in greater detail above, some implementations described herein provide an optical receiver system. The optical receiver system includes a demultiplexer device. The optical receiver system includes a phase shifter device coupled with the demultiplexer device. The optical receiver system includes a power splitter device. The optical receiver system includes a photodiode device coupled with the power splitter device.

As described in greater detail above, some implementations described herein provide a method. The method includes receiving, by an optical circuit between a two-dimensional grating coupler device and a photodiode device, first incident light and second incident light. The method includes converting, by the optical circuit and the photodiode device, the first incident light and the second incident light into respective time-fixed photocurrents. The method includes providing, by the photodiode device to a transimpedance amplifier, electrical currents based on the respective time-fixed photocurrents. The method includes converting by the transimpedance amplifier, the electrical currents to an output voltage that is used by an optical communication system.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, the term "and/or," when used in connection with a plurality of items, is intended to cover each of the plurality of items alone and any and all combinations of the plurality of items. For example, "A and/or B" covers "A and B," "A and not B," and "B and not A."

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical receiver system, comprising:
   a first phase shifter configured to receive first incident light;
   a second phase shifter configured to receive second incident light;
   a demultiplexer coupled with a first output of the first phase shifter and a second output of the second phase shifter;

a first power splitter, coupled with the first output of the first phase shifter, having a first controllable power splitting ratio; and a second power splitter, coupled with the second output of the first phase shifter, having a second controllable power splitting ratio; and a photodiode coupled with the first power splitter and the second power splitter.

2. The optical receiver system of claim 1, wherein at least one of the first phase shifter or the second phase shifter comprises:

a thermal phase shifter including an integrated circuit that uses thermal-induced phase change, free-carrier injection to synchronize light waves of first incident light and second incident light.

3. The optical receiver system of claim 1, wherein the demultiplexer comprises a multimode interference comprising a plurality of input ports and a plurality of output ports.

4. The optical receiver system of claim 1, wherein at least one of the first power splitter or the second power splitter comprises:

a directional coupler configured to control a ratio of a first output to a second output.

5. The optical receiver system of claim 1, wherein a first waveguide of the photodiode connects with a first output of the first power splitter, and wherein a second waveguide of the photodiode connects with a first output of the second power splitter.

6. The optical receiver system of claim 1, wherein an input of at least one of the first phase shifter or the second phase shifter connects with an output of a two-dimensional grating coupler.

7. The optical receiver system of claim 1, wherein the first phase shifter, the second phase shifter, the demultiplexer, the first power splitter, and the second power splitter are implemented on a single semiconductor die.

8. The optical receiver system of claim 1, wherein the first phase shifter, the second phase shifter, the demultiplexer, the first power splitter, and the second power splitter are distributed across at least two semiconductor dies.

9. An optical receiver system, comprising:

a demultiplexer;

a phase shifter coupled with the demultiplexer;

a power combiner, wherein:

at least one input of the demultiplexer connects with an output of a two-dimensional grating coupler, and at least one input of the phase shifter connects with an output of the demultiplexer, and at least one input of the power combiner connects with an output of the phase shifter;

a power splitter, wherein at least one input of the power splitter connects with an output of the power combiner; and a photodiode coupled with the power splitter.

10. The optical receiver system of claim 9, wherein the demultiplexer comprises:

a multimode comprising two input ports and two output ports.

11. The optical receiver system of claim 9, wherein the power splitter comprises:

a multimode comprising two input ports and two output ports, configured to control a ratio of a first output of the power splitter to a second output of the power splitter.

12. The optical receiver system of claim 9, wherein the power combiner comprises:

a y-junction.

13. The optical receiver system of claim 9, wherein the demultiplexer, the phase shifter, the power combiner, and the power splitter are on a single semiconductor die.

14. The optical receiver system of claim 9, wherein the demultiplexer, the phase shifter, the power combiner, and the power splitter are distributed across at least two semiconductor dies.

15. The optical receiver system of claim 9, wherein the phase shifter comprises a plurality of phase shifters configured to adjust phase relationships of signals corresponding to different wavelengths, and wherein the output of the power combiner comprises outputs of the plurality of phase shifters combined by the power combiner.

16. A method, comprising:

receiving, by an optical circuit between a two-dimensional grating coupler and a photodiode, first incident light and second incident light, wherein the first incident light and the second incident light include light waves of multiple wavelengths;

transmitting the first incident light and the second incident light through respective phase shifters;

transmitting outputs from the respective phase shifters to a demultiplexer;

transmitting an output of a first wavelength from the demultiplexer through a first power splitter having a first controllable power splitting ratio;

transmitting an output of a second wavelength from the demultiplexer through a second power splitter having a second controllable power splitting ratio;

providing, by the photodiode to a transimpedance amplifier, electrical currents based on respective time-fixed photocurrents; and converting, by the transimpedance amplifier, the electrical currents to an output voltage that is used by an optical communication system.

17. The method of claim 16, wherein the respective phase shifters comprise thermal phase shifters including an integrated circuit that uses thermal-induced phase change, free-carrier injection to synchronize the first incident light and the second incident light.

18. The method of claim 16, wherein the demultiplexer comprises a multimode interference comprising two input ports and two output ports.

19. The method of claim 16, wherein the first controllable power splitting ratio and the second controllable power splitting ratio are adjusted based on a wavelength of the output from the demultiplexer.

20. The method of claim 16, wherein transmitting the outputs from the respective phase shifters to the demultiplexer comprises transmitting through waveguide-based structures formed on a semiconductor substrate.

* * * * *